US007610410B2

United States Patent
Uehara

(10) Patent No.: US 7,610,410 B2
(45) Date of Patent: Oct. 27, 2009

(54) METHOD AND A SYSTEM FOR ESTABLISHING A CONNECTION WITH IDENTIFICATION AND GROUP INFORMATION

(75) Inventor: Teruaki Uehara, Kanagawa (JP)

(73) Assignee: Oki Semiconductor Co., Ltd. (JP)

( * ) Notice: Subject to any disclaimer, the term of this patent is extended or adjusted under 35 U.S.C. 154(b) by 469 days.

(21) Appl. No.: 11/513,303

(22) Filed: Aug. 31, 2006

(65) Prior Publication Data

US 2007/0073842 A1    Mar. 29, 2007

(30) Foreign Application Priority Data

Sep. 6, 2005    (JP)    ............................. 2005-257501

(51) Int. Cl.
*G06F 3/00* (2006.01)
*G06F 15/16* (2006.01)
*G06F 9/26* (2006.01)
(52) U.S. Cl. .............. 710/9; 709/245; 710/3; 710/8; 711/200; 711/220
(58) Field of Classification Search ................ 709/220, 709/222, 245; 710/1, 3–4, 8–9; 711/200, 711/220
See application file for complete search history.

(56) References Cited

U.S. PATENT DOCUMENTS

| 6,535,947 | B1 * | 3/2003 | Amoni et al. ............... 710/305 |
| 6,603,744 | B2 | 8/2003 | Mizutani et al. |
| 7,219,141 | B2 * | 5/2007 | Bonasia et al. .............. 709/220 |
| 2001/0049263 | A1 * | 12/2001 | Zhang ....................... 455/67.1 |
| 2006/0149858 | A1 * | 7/2006 | Bhesania et al. ............... 710/5 |
| 2006/0187897 | A1 * | 8/2006 | Dabbs et al. ................ 370/349 |

FOREIGN PATENT DOCUMENTS

JP    11-112524    4/1999

* cited by examiner

*Primary Examiner*—Alford W Kindred
*Assistant Examiner*—Richard Franklin
(74) *Attorney, Agent, or Firm*—Studebaker & Brackett PC; Donald R. Studebaker

(57) ABSTRACT

A method for establishing a wireless connection between a first wireless device provided in a computer and a second wireless device, wherein group information that identifies the first wireless device is created and set for the first wireless device. The group information is transmitted to the second wireless device and is set for it. The first wireless device creates identification information that identifies the second wireless device with the group information to set it for the second wireless device. The first wireless device uses both of the group information and identification information to specify the second wireless device.

17 Claims, 6 Drawing Sheets

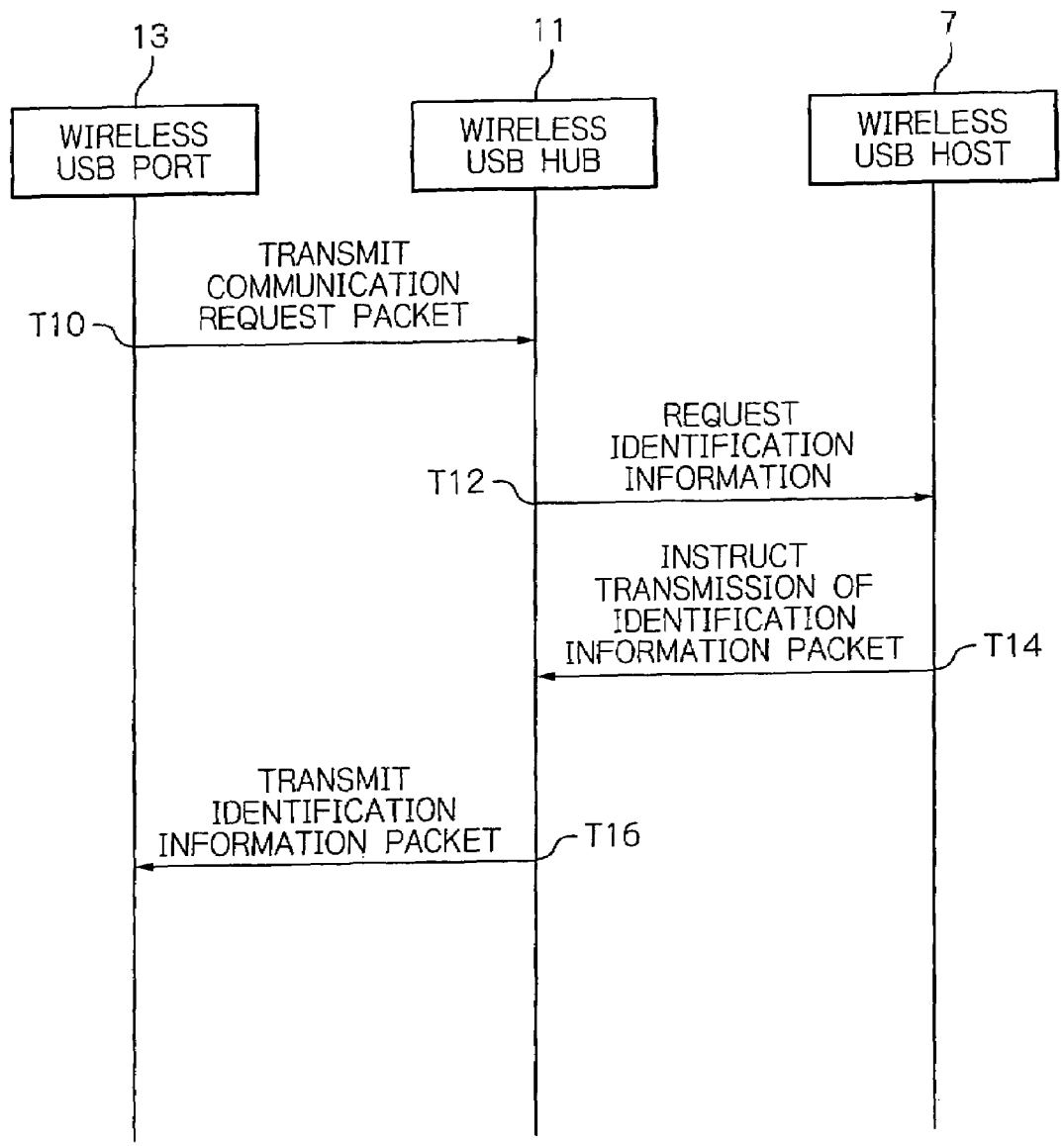

METHOD AND A SYSTEM FOR ESTABLISHING A CONNECTION WITH IDENTIFICATION AND GROUP INFORMATION

BACKGROUND OF THE INVENTION

1. Field of the Invention

The present invention relates to a method and a system for establishing a connection in wireless communication, and more particularly, to a method and a system for establishing a connection first when a device is wirelessly connected to a USB (Universal Serial Bus) provided in a computer.

2. Description of the Background Art

The USB is commonly used as a method for connecting a low- and a medium-speed device such as a keyboard, a mouse, or a printer to a computer such as a personal computer or a PDA (Personal Digital Assistant). The USB may provide less burden on a user than the conventional connection methods because it is commonly available to different types of devices and has the Hot Plug & Unplug function that may easily change the connection even when the computer is in use.

For the mobile computer such as a notebook computer or PDA, however, the user may bear a burden of use of a USB cable necessary for connecting the device to the USB, thereby creating a need for the USB to be wirelessly connected.

U.S. Pat. No. 6,603,744 B2 to Mizutani et al., discloses a USB that is wirelessly connectable to a device, i.e. a wireless USB. Mizutani et al., uses a method for specifying the device by setting a specific identification number to a particular device, which is necessary for establishing a connection between the device and computer via the wireless USB. In other words, an identification number is set for a particular device, which is used to specify the device to be wirelessly connected to the wireless USB.

The method using an identification number set for a particular device needs, however, to distinguish the device from others, thus requiring identification numbers to carry more information. As a result, a problem arises that much more load is incurred on the computer, wireless USB and device, thus deteriorating the communication efficiency.

Specifically, the wireless USB connects a device, of course, not via a wired connection such as a cable, unlike the wired USB that connects a device via a wired connection. That requires a signal to be transmitted from a wireless USB to carry information identifying a target device to be wirelessly communicated with so as to specify the target device to be wirelessly connected. Mizutani et al., proposes the method of allotting identification numbers to respective device, and making the identification numbers included in signals to be transmitted. This method needs, however, to create identification numbers such that all devices are able to be distinguished specifically, thus requiring the identification numbers complicated and more voluminous as requiring 48 bits. As a result, much more information has to be transmitted between the wireless USB and device, thereby incurring heavier load on the computer, wireless USB and device, and thus causing the communication efficiency to decrease.

SUMMARY OF THE INVENTION

It is an object of the present invention to provide a method and a system for establishing a connection between a device and a computer via a wireless USB without deteriorating the communication efficiency or incurring more load to the computer or the like.

The present invention focuses attention on a limited number of devices which may be wirelessly connected to one wireless USB. It is therefore not necessary to individually distinguish all devices, but is sufficient only to individually distinguish devices to be wirelessly connected to the same wireless USB. The target wireless USB to be wirelessly connected is then specified by grouping the wireless USB and devices to be wirelessly connected to that wireless USB, and by setting identification information for each device belonging to the same group.

Specifically, the present invention sets group information for each wireless USB, and sets the same group information for the devices to be wirelessly connected to that wireless USB. The identification information is then set for each device to which the same group information has been set. The each device can therefore be distinguished by the identification information as well as the group information. Consequently, the devices having the same identification information and different group information, for example, are able to be distinguished as different devices from each other with their group information. It is thus possible to prevent a complicated structure of identification information from being used and to provide less identification information.

Consequently, it is possible to reduce the volume of the information transmitted between a computer and a device to thereby prevent the communication efficiency from decreasing and more load from being applied to the computer or the like. It is to be noted that even for little identification information, group information and identification information in combination can establish a connection between a target device and a computer.

In summary, in accordance with the present invention, a connection establishment method uses group information and identification information in combination, and can therefore have a volume of identification information reduced, thereby preventing communication efficiency from decreasing and more load from being applied to a computer.

BRIEF DESCRIPTION OF THE DRAWINGS

The objects and features of the present invention will become more apparent from consideration of the following detailed description taken in conjunction with the accompanying drawings in which:

FIG. 6 is a sequence chart useful for understanding an example of the processing procedure in the wireless USB port, wireless USB hub, and USB host shown in FIG. 2.

DESCRIPTION OF THE PREFERRED EMBODIMENT

Figure 1:
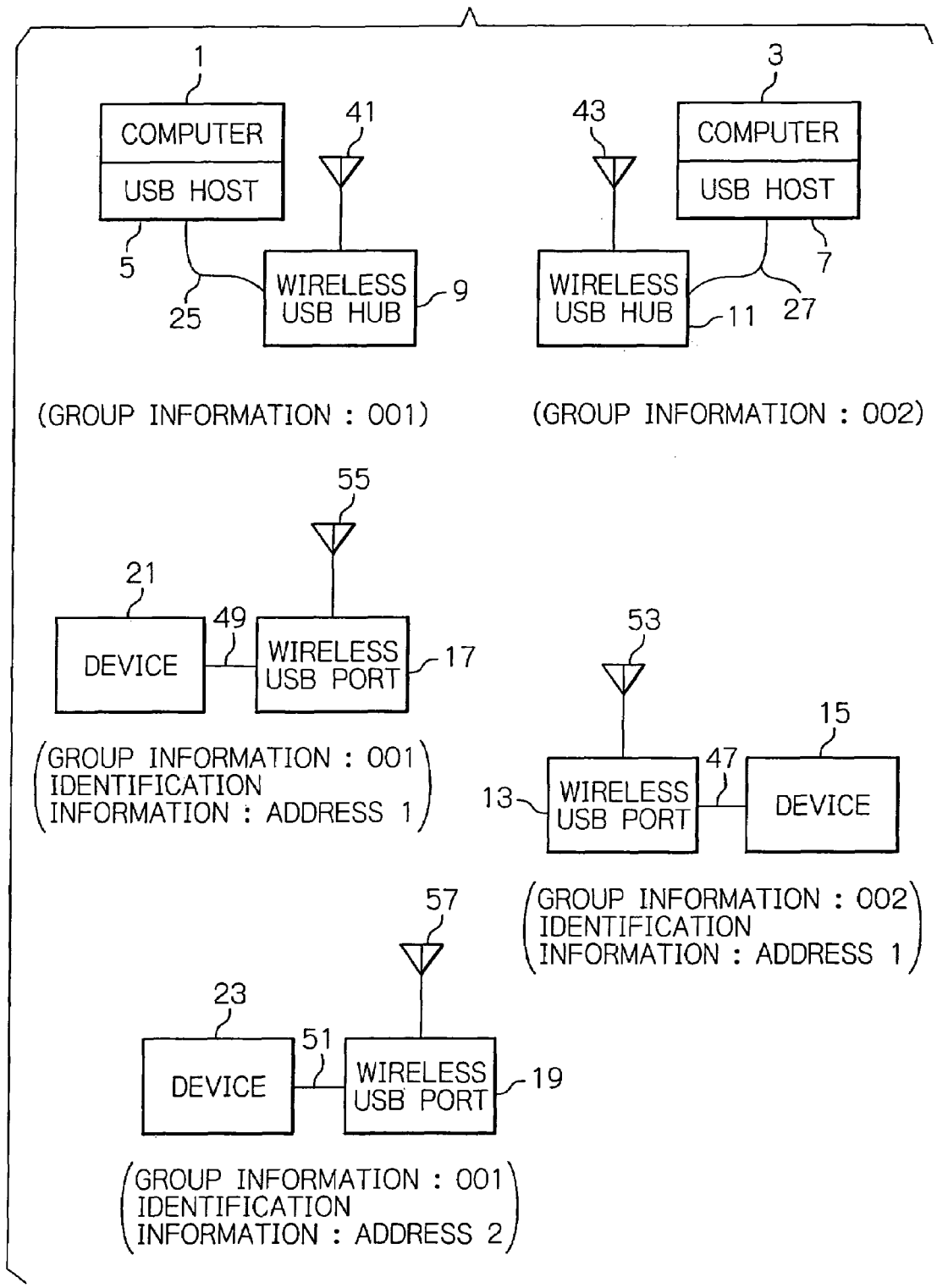
FIG. 1 shows an example of the environment in wireless connection according to the present invention.
Figure 2:
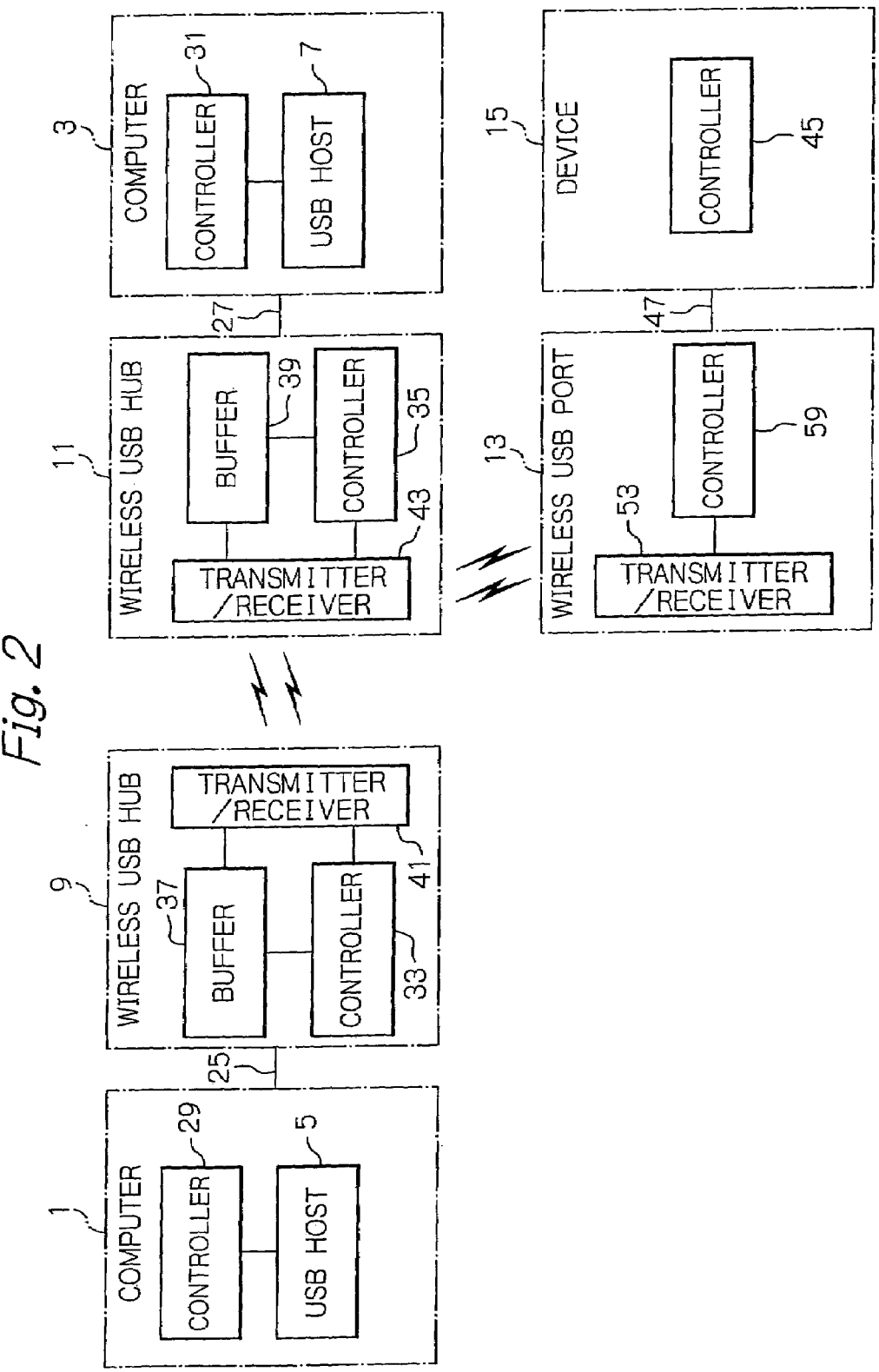
FIG. 2 is a schematic block diagram showing an embodiment of the system including the components shown in FIG. 1 in accordance with the invention.

With reference to the accompanying drawings, a preferred embodiment of the present invention will be described below in more detail. FIG. 1 shows an example of the environment in wireless connection via the wireless USB in accordance with the method of the present invention. FIG. 2 is a schematic block diagram more specifically showing an embodiment of the invention comprising computers, such as personal computers 1 and 3, USB hosts 5 and 7, wireless USB hubs 9 and 11, a wireless USB port 13 and a device 15, which are also shown in FIG. 1. FIG. 2 does not include wireless USB ports 17 and 19, and devices 21 and 23, which are shown in FIG. 1 and have the same configuration as the wireless USB port 13 and device 15, respectively. The same reference numerals in the figures designate like elements.

As shown, the computers 1 and 3 include the USB host 5 and 7 and controllers 29 and 31, and are also provided with the wireless USB hubs 9 and 11, respectively. Note that although the instant embodiment includes the personal computers 1 and 3 as computers, the present invention is not limited thereto. The invention may be applied to, but not limited to, any types of computers, such as a notebook computer and PDA or handheld computer.

The USB hosts 5 and 7 are a general-purpose controller for the devices provided in the computers 1 and 3, respectively. In the illustrative embodiment, the USB hosts 5 and 7 are connected to the wireless USB hubs 9 and 11 via USB cables 25 and 27, respectively, thereby forming USBs wirelessly connected to the devices, i.e. wireless USBs. Although with this embodiment the USB hosts are provided in the respective computers, the present invention is not limited to such a specific system structure. The USB hosts 5 and 7 may alternatively be provided in the wireless USB hubs 9 and 11, respectively. The controllers 29 and 31 are general-purpose controllers adapted to control the operation of the entire computers 1 and 3 respectively. The controllers 29 and 31 are also adapted to control the wireless USB hubs 9 and 11 through the USB hosts 5 and 7, respectively. The USB hosts 5 and 7 are adapted to transmit and receive a signal in the form of packets, under the control of controllers 29 and 31 to and from the wireless USB hubs 9 and 11, respectively.

The wireless USB hubs 9 and 11 are connectors on the side of the computers 1 and 3, respectively. The wireless USB hubs 9 and 11 also include controllers 33 and 35, buffers 37 and 39 connected to the controllers 33 and 35, and transmitter/receivers 41 and 43 connected to both the controllers 33 and 35 and the buffers 37 and 39, respectively. The controllers 33 and 35 are general-purpose controllers for the wireless USB hubs 9 and 11, respectively. The buffers 37 and 39 are temporary memory devices that are adapted to store the packets to be transmit or received. The transmitter/receivers 41 and 43 receive and transmit packets form and to the wireless USB port of the device connected wirelessly to the computers 1 and 3, respectively.

The wireless USB hubs 9 and 11 thus receive packets from the USB hosts 5 and 7, and transmit the received packets to the wireless USB ports 13, 17 and 19, as will be described below, by the transmitter/receivers 41 and 43, respectively. The wireless USB hubs 9 and 11 also receive packets from the wireless USB ports 13, 17 and 19 by the transmitter/receivers 41 and 43, and transmit the received packets to the USB hosts 5 and 7, respectively. The wireless USB hubs 9 and 11 may temporarily store the received packets in the buffers 37 and 39, respectively, before transmitting them.

As shown FIG. 1, there are three devices 15, 21 and 23 around the computers 1 and 3. Of course, the number of the devices to be wirelessly connected is not limited to that described with respect to the illustrative embodiment. Any number of the devices may be connected, and any device may be connected to the wireless USBs, including, but not limited to, the medium- and low-speed devices such as a keyboard, a mouse and a printer.

The device 15 includes a controller 45 and is provided with the wireless USB port 13. The controller 45 controls the device 15 for required processing. Note that, although not specifically shown, the devices 21 and 23 each also include a controller and are controlled to execute required processing. The wireless USB port 13 17 and 19 are connectors on the device side. The wireless USB port 13 includes a transmitter/receiver 53 and a controller 59, and is connected to the device 15 via a USB cable 47. Note that, although not shown, the wireless USB ports 17 and 19 also include transmitter/receivers and controllers. The transmitter/receiver 53 transmits and receives packets to and form the wireless USB hub of the computer connected wirelessly to the device 15. The controller 59 is a general-purpose controller adapted to control the operation of the entire wireless USB port 13.

The wireless USB ports 13, 17 and 19 thus receive packets from the device 15, 21 and 23, and transmit the received packets to the desired wireless USB hosts 5 and 7 of the computers 1 and 3 connected wirelessly to the devices 15, 21 and 23 by the respective transmitter/receivers, respectively. The wireless USB ports 13, 17 and 19 also receive packets from the wireless USB hosts 5 and 7 by the respective transmitter/receivers, and transmit the received packets to the devices 15, 21 and 23, respectively.

When the wireless USB port is connected wirelessly to a desired wireless USB hub, the computer can wirelessly be connected to the desired device. In this embodiment, specifically, the wireless USB port 13 is wirelessly connected to the wireless USB hub 11 provided to the computer 3. Likewise, the wireless USB ports 17 and 19 are wirelessly connected to the wireless USB hub 9 provided to the computer 1. The packet transfer, i.e. communication, between the wireless USB ports 13, 17 and 19 and the wireless USB hubs 9 and 11, as described above, allows required processing between the devices 15, 21 and 23 and the computers 1 and 3.

In FIG. 1, when the computers 1 and 3 try to be wirelessly connected to the devices 15, 21 and 23, i.e. when the wireless USB hubs 9 and 11 try to be wirelessly connected to desired one of the wireless USB port 13, 17 and 19, in order to transmit and receive packets, the computers 1 and 3 need to specify the wireless USB port 13, 17 and 19 to be connected, respectively. More specifically, in the wireless USB connection, since there are no wired connections, such as a cable, between the wireless USB ports 13, 17 and 19 and the wireless USB hubs 9 and 11, it is necessary to have a packet, to be transmitted from the wireless USB hubs 9 and 11, contain information for distinguishing desired one of the wireless USB ports 13, 17 and 19 in order to specify the desired USB port 13, 17 or 19. To do so, this embodiment is adapted to set group information and identification information for each of the wireless USB hubs 9 and 11 and wireless USB ports 13, 17 and 19, and make the information be carried in a packet to specify the wireless USB ports 13, 17 and 19 to be connected.

The group information is prepared for distinguishing individually the wireless USB hubs. The group information is also set in common to both of the wireless USB hub and the wireless USB ports wirelessly connected to the wireless USB hub. This means that a wireless USB port allotted to specific group information will be connected to a wireless USB hub allotted to the same group information as that wireless USB port. The group information also needs to be set in a non-overlapping manner between the adjacent wireless USB hubs.

In the illustrative embodiment, the wireless USB hub 9 and the wireless USB ports 17 and 19 connected to the wireless USB hub 9 are allotted to the group information "001". Likewise, the wireless USB hub 11 and the wireless USB port 13 connected to the wireless USB hub 11 are allotted to the group information "002". Of course, the values to be set as the group information for the wireless USB hub and port are only illustrative and may be changed or modified, as desired, into e.g. other values, codes, symbol, letters, characters or combination thereof. The volume of the group information may also be arbitrary, but too much information would cause the communication efficiency to decrease, and conversely too little information cannot function as the group information. The group information is thus preferably, but not limited to, two bits or more and 120 bits or less, and more preferably, three bits or more and 10 bits or less.

The identification information is arranged for distinguishing the wireless USB ports from each other, which are assigned to the same group information. The identification information thus needs to be set in a non-overlapping manner among the wireless USB ports with the same group information. In this embodiment, the identification information set for each wireless USB port is a USB address represented by seven bits. The wireless USB ports 17 and 19 which are to be set to the same group information "001" are set to "address 1" and "address 2", respectively, as the identification information thereof. Likewise, the wireless USB port 13 which is to be set to the group information "002" is assigned to "address 1" as its identification information.

Even when the identification information is overlapped between the wireless USB port 13 and wireless USB port 17 like the instant embodiment, it is possible to distinguish them because of their different group information. Note that although this embodiment uses the identification information represented by a seven-bit number, the present invention is not limited thereto, but anything may be used as the identification information as desired. Moreover, the capacity of the identification information is not limited to seven bits, but any amount of identification information may be used. Too much information may, however, reduce the communication efficiency or may apply more load to the devices. The identification information is thus preferably, but not limited to, 20 bits or less, and more preferably, 10 bits or less.

Figure 3:
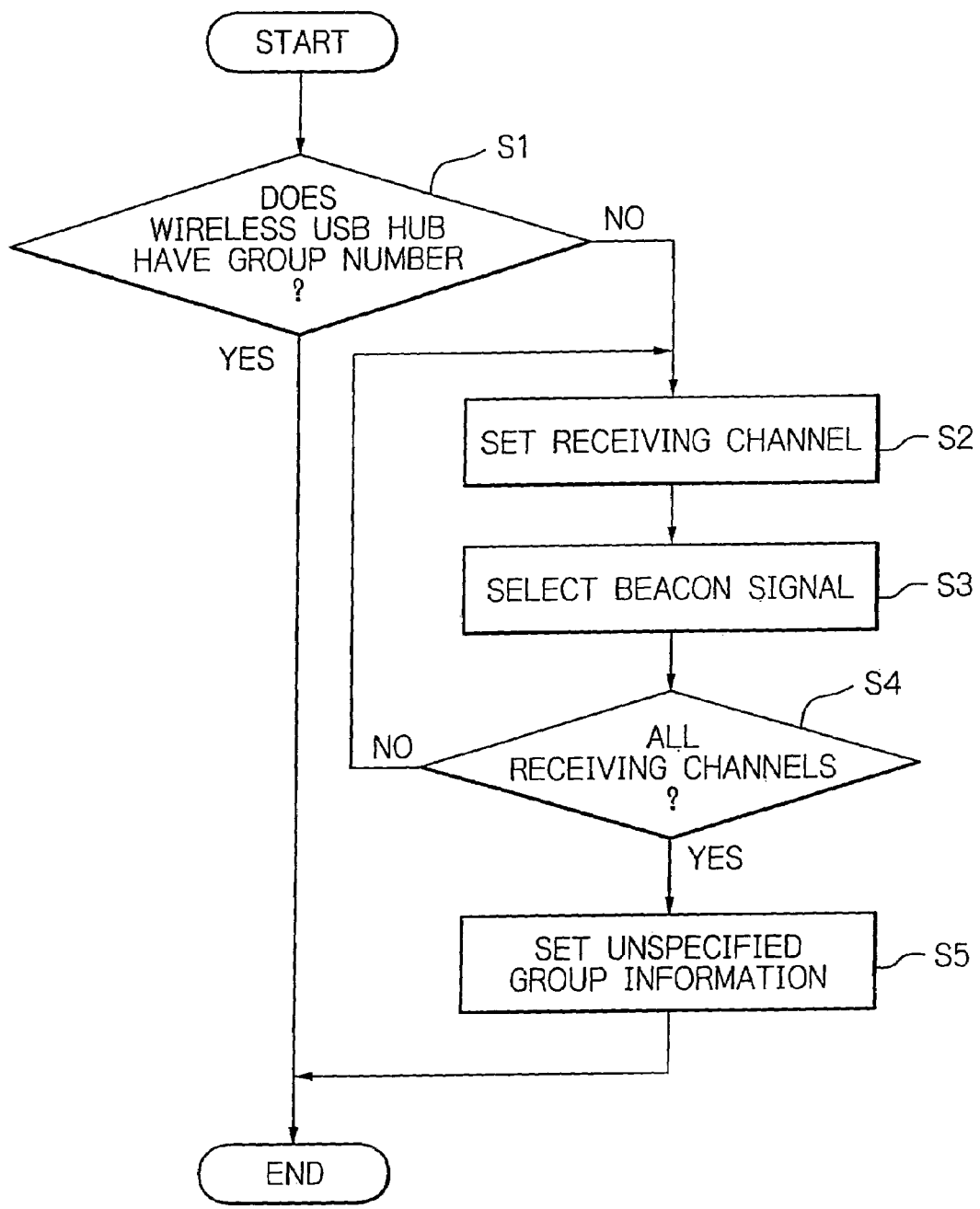
FIGS. 3 and 4 are flowcharts useful for understanding an example of the processing procedure in the wireless USB hub shown in FIG. 2.

FIG. 3 is a flowchart showing an example of the processing procedure for creating and setting the group information in the wireless USB hub 11 shown in FIGS. 1 and 2. The situation which will be described with reference to FIG. 3 is that, as seen from FIGS. 2 and 3, the wireless USB hub 9 staying near the wireless USB hub 11 has already set to the group information "001", whereas the wireless USB hub 11 is about to create the group information "002" in order to set the information for the wireless USB hub 11. In FIGS. 1, 2, and 3, the wireless USB hub 9 which has already set to the group information "001" transmits a beacon signal at a predetermined, constant interval on any wireless channel from the transmitter/receiver 41 under the control of the controller 33 in order to inform another near-by wireless USB hub having its group information "001".

On the other hand, the wireless USB hub 11 determines, at its startup, i.e. before the wireless USB hub 11 itself transmits the beacon signal, whether or not the group information is set for the wireless USB hub 11 (step S1). If the wireless USB hub 11 determines that the group information is not set for the wireless USB hub 11 (No, step S1), the wireless USB hub 11 switches the beacon signal's intervals and wireless channels to detect and receive the beacon signal transmitted from any other wireless USB hub, i.e. the wireless USB hub 9, positioning near the wireless USB hub 11 (steps S2, S3, and S4), and determines which group information is used by the wireless USB hub 9. The wireless USB hub 11 then produces group information that has not been specified, i.e. "002" in this case, and sets it as the group information for itself, i.e. stores it in its storage not shown (step S5). Subsequently, the wireless USB hub 11 completes the processing for setting the group information and transmits the beacon signal to inform other wireless USB hubs located near by of its group information as with the wireless USB hub 9. Conversely, if the wireless USB hub 11 determines at the startup that the group information has been already set, (Yes, step S1) the wireless USB hub 11 does not produce any additional group information but transmits the beacon signal to inform the neighboring wireless USB hubs of its registered group information.

In this way, the wireless USB hub 11 creates and sets the group information. Note that although in this embodiment the wireless USB hub 11 automatically creates and sets the group information by oneself, the present invention is not limited thereto, but any suitable methods may be used. Any suitable methods include, but not limited to, allowing a user to use a dip switch adapted to manually set the group information for the wireless USB hub 11.

After the wireless USB hub 11 has its group information set, the hub 11 transmits that group information to the wireless USB port 13 connected to thereto in order to have the wireless USB port 13 set the same group information.

Figure 4:
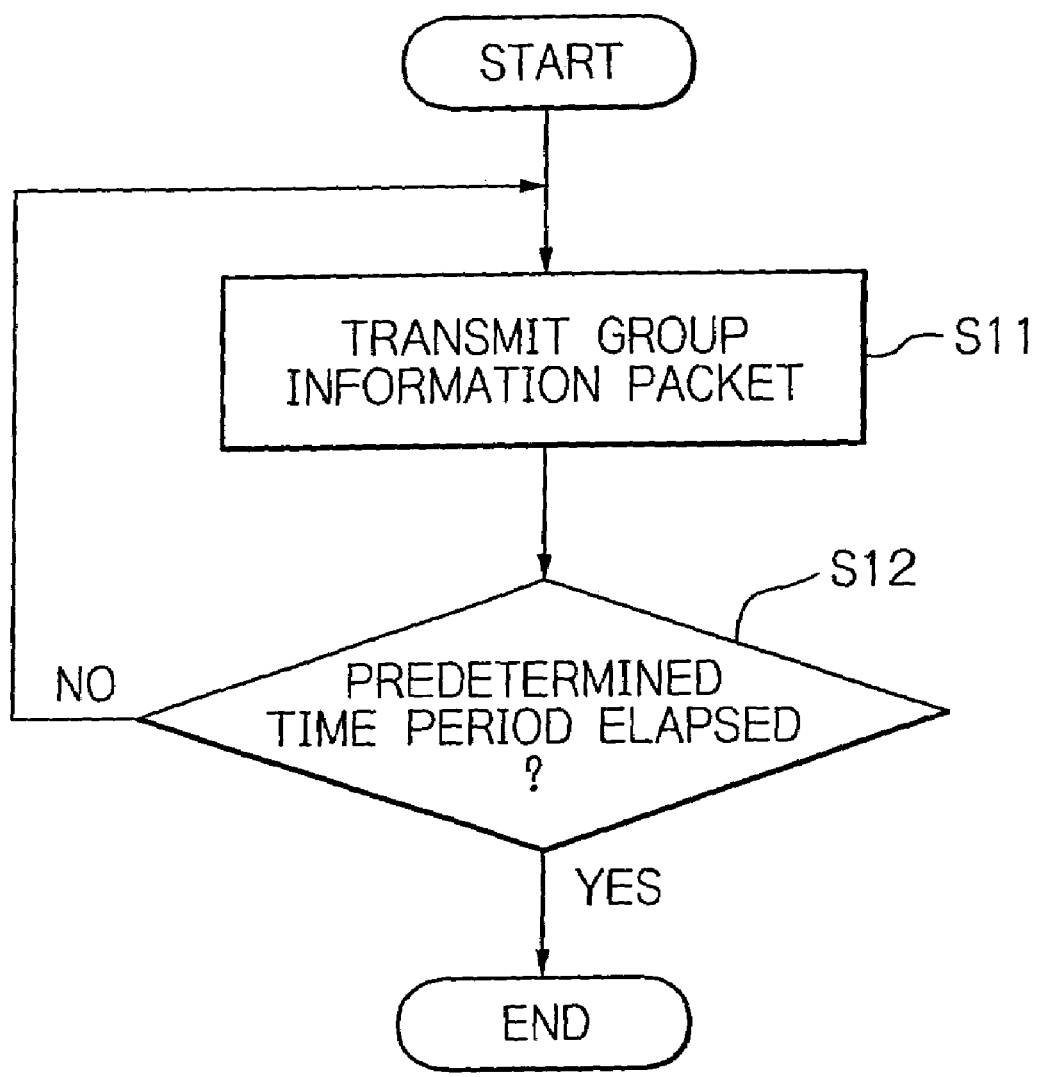

Well, FIG. 4 is a flowchart of an example of the procedure for transmitting the group information to the wireless USB port 13 in the wireless USB hub 11 which has already set the group information. Referring to FIGS. 1, 2 and 4, when the wireless USB hub 11 acquires the group information, the controller 31 in the computer 3 assembles a packet including the group information, referred to as a group information packet. The controller 31 then instructs the wireless USB hub 11 to cause the transmitter/receiver 43 to transmit the group information packet to the wireless USB port 13. In response to the instruction, the wireless USB hub 11 causes the transmitter/receiver 43 to transmit the group information packet (step S1).

The wireless USB hub 11 may store temporarily the group information packet in the buffer 39 in order to transmit the packet to the wireless USB port 13 when the wireless USB hub 11 is not transmitting or receiving the packet to or from any other wireless USB port, not shown, or when the wireless USB ports 17 and 19 or wireless USB hub 9 neighboring the wireless USB hub 11 are not transmitting or receiving the packet, i.e. they are in the idle time thereof. The wireless USB hub 11 transmits the group information packet when the wireless USB hub 11 is not transmitting or receiving the packet to or from another wireless USB port. As a result, the wireless USB hub 11 can transmit the group information packet to the wireless USB hub 13 without preventing the communication between the wireless USB hub 11 and other wireless USB port which has already wirelessly connected to the wireless USB hub 11.

Moreover, the wireless USB hub 11 transmits the group information packet when the wireless USB ports 17 and 19 or wireless USB hub 9 neighboring the wireless USB hub 11 are not transmitting or receiving the packet. As a result, the wireless USB port 13 has no need to sense the packets from the wireless USB hub 9 or wireless USB ports 17 and 19, but then the wireless USB port 13 can smoothly receive the group information packet and smoothly set the group information. Note that the present invention is not limited to the aspects described above but the group information packet may be transmitted at any time.

The group information packet may also include any information to be hidden, such as a key for encrypting information or decrypting the encrypted information, which should not be disclosed to any third party other than the wireless USB hub and the wireless USB port connected to that wireless USB hub. When the group information packet includes the information to be hidden, the included information is able to be passed safely to the wireless USB port. This is because that the group information packet is transmitted only at the startup of the new wireless USB hub or when the new wireless USB port is added and hence care may be taken to prevent the information included in the group information packet from leaking out only when the group information packet is transmitted to the wireless USB port. Note that the present invention is not limited to the aspects described above, but the group information packet may contain at least group information and may selectively contain any additional information.

After transmission of the group information packet, the controller 35 determines whether or not a predetermined period of time is elapsed (step S12). If the predetermined period of time is elapsed (Yes step S12), the wireless USB hub 11 ends the transmission of the group information packet. Conversely, if the predetermined period of time is not elapsed (No, step S12), the wireless USB hub 11 keeps on transmitting the group information packet. In this embodiment, the wireless USB hub 11 ends the transmission after having transmitted the group information packet substantially for 30 seconds to one minute. Note that the transmission time of the group information packet may be set to any value. Too long transmission time, however, may only increase the load on the wireless USB hub 11. The transmission time is preferably, but not limited to, substantially three minutes or less, and more preferably, substantially 20 seconds or more but two minutes or less. The transmitter/receiver 53 in the wireless USB port 13 receives the group information packet thus transmitted.

Figure 5:
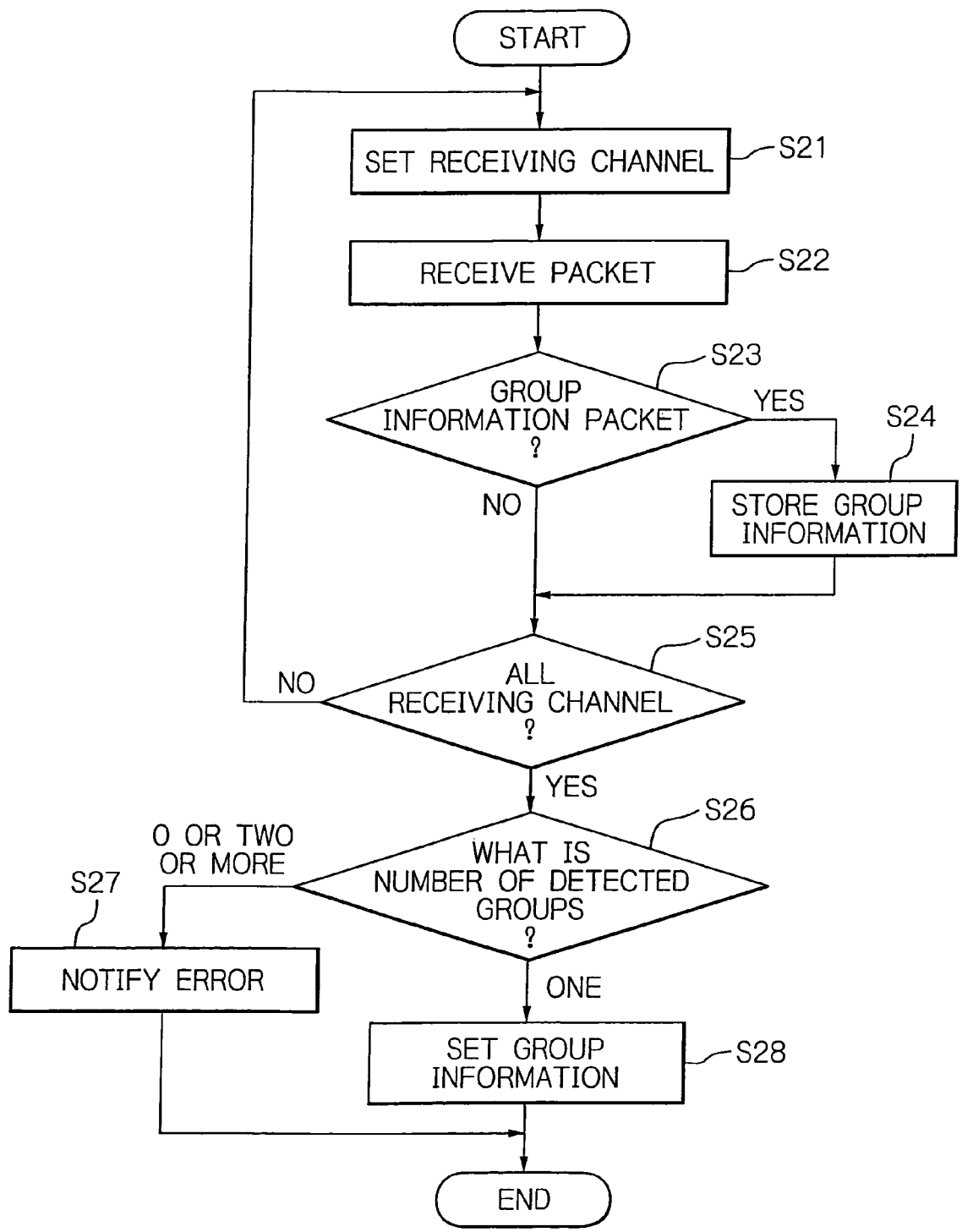
FIG. 5 is a flowchart useful for understanding an example of the processing procedure in the wireless USB port shown in FIG. 2.

FIG. 5 is a flowchart of an example of the procedure for receiving the group information packet transmitted from the wireless USB hub 11 and setting the information in the wireless USB port 13 shown in FIGS. 1 and 2. With reference to FIGS. 1, 2, and 5, when the wireless USB hub 11 starts transmitting the group information packet, the wireless USB port 13 sets the receiving channel in order to detect and receive the group information packet with the transmitter/receiver 53 (steps S21 and S22). After receiving the packet, the controller 59 determines whether or not the packet is the group information packet (step S23). If it is determined that the packet is the group information packet (Yes, step S23), then the controller 59 stores the group information included in the packet in, e.g. a buffer, not shown (step S24). Conversely, if the answer of the step S23 is negative (No), then the controller 59 stores nothing.

The wireless USB port 13 repeats the above-described processing on every receiving channel (step S25). After steps S21 to S24 are completed on every receiving channel, the controller 59 determines the number of the pieces of group information stored (step S26). If the number of the pieces of group information stored is zero or two or more, then the controller 59 has the transmitter/receiver 53 transmit an error notification packet which informs an error to the wireless USB hub 11 (step S27). After receiving the error notification packet, the wireless USB hub 11 transmits the group information packet again. In response to the transmission of the packet, the wireless USB port 13 performs the procedure again. Conversely, if the number of pieces of the group information is one, then the controller 59 sets the information as the group information for itself, i.e. the controller 59 stores the information in the storage, not shown (step S28). This is the end of the procedure shown in FIG. 5.

Note that although the wireless USB hub 11 may automatically transmit the group information packet to the wireless USB port 13 and the wireless USB port 13 may automatically set the group information, a user may manually perform the above operations. Any other suitable method may also be used, including, but not limited to, the following. The wireless USB hub 11 and wireless USB port 13 may automatically perform the above-described operations using the controllers 31, 35, 59 and 45 provided in the computer 3, wireless USB hub 11, wireless USB port 13, and device 15, respectively. Alternatively, a user may manually perform the above-described operations. For example, a user may instruct the wireless USB hub 11 to transmit the group information packet carrying the group information and then may instruct the wireless USB port 13 to receive the group information packet. Note that in either the automatic or manual operation, the wireless USB port 13 needs to receive the group information packet while the wireless USB hub 11 to be wirelessly connected is transmitting the group information packet.

After having set the group information, the wireless USB port 13 has its identification information set for individually identifying itself in the same group. FIG. 6 is a sequence chart of an example of the procedure for setting the identification information for the wireless USB port 13 shown in the FIGS. 1 and 2. Referring to FIGS. 1, 2 and 6, for setting the identification information, the wireless USB port 13 transmits to the wireless USB hub 11 at time T10 a packet, named a communication request packet, which includes a code for requesting communication, the group information and provisional identification information. The provisional identification information is temporary information used to identify the wireless USB port 13 that has transmitted the communication request packet. This embodiment uses a random number generated by the controller 59 in the wireless USB port 13 as the provisional identification information.

It is to be noted that although the specific, illustrative embodiment uses a random number, the present invention is not limited thereto. Anything may be used which may identify the wireless USB port 13 that has transmitted the communication request packet. The provisional identification information is also preferably, but not limited to, two bits or more but 15 bits or less, and more preferably three bits or more but 10 bits or less, because too much information would degrade the communication efficiency, and conversely, too little information cannot distinguish the provisional identification information from signals transmitted from other wireless USB ports.

After having received the communication request packet from the wireless USB port 13, the wireless USB hub 11 requests the USB host 7 at time T12 to create the identification information. In this embodiment, the identification information is a USB address represented by seven bits. After creating the identification information, the USB host 7 instructs the wireless USB hub 11 at time T14 to transmit to the wireless USB port 13 a packet, i.e. an identification information packet, including the identification information, the group information, a code indicating the transmission of the identification information, and the provisional identification information. In response to this instruction, the wireless USB hub 11 transmits the identification information packet to the wireless SUB port 13 at time T16. The wireless USB hub 11 may transmit the identification information packet during its idle time as in the transmission of the group information packet.

The wireless USB port 13 receives the identification information packet and uses the group information and provisional identification information that are included in the identification information packet as a basis to recognize the received packet as the packet meant for the wireless USB port 13. The wireless USB port 13 then sets for itself the identification information included in the identification information packet, i.e. stores the USB address in the storage.

In the setting process for the group information and identification information, the same channel is preferably used for all transmission from the wireless USB hub 11 to wireless USB port 13. This is because even when the wireless USB hub 11 needs to transmit a signal to another wireless USB port, for example, the wireless USB hub 11 can transmit the packet to the wireless USB port 13 without preventing the transmission of the signal, thereby establishing the efficient transmission processing.

In this way, the group information and identification information are set for both of the wireless USB hub 11 and wireless USB port 13, thereby establishing the connection between the wireless USB hub 11 and wireless USB port 13. The group information and identification information remain stored until initialized. After the group information and identification information are set, they may used to specify the wireless USB port 13 to be wirelessly connected. More specifically, between the wireless USB hub 11 and wireless USB port 13, a packet including group information and identification information is transmitted and received to perform the processing required for the device 15 or computer 3.

Briefly, in the present invention, since identification information and group information may be included in one packet, the volume of the identification information can be reduced, such as seven bits, as compared with the conventional technology, thereby making it possible to transmit and receive the packet between a wireless USB hub and a wireless USB port without deteriorating communication efficiency or increasing the load.

The entire disclosure of Japanese patent application No. 2005-257501 filed on Sep. 6, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method for establishing a wireless connection between a first wireless device provided in a first computer and a second wireless device, and between a third wireless device provided in a second computer which is different from the first computer and a fourth wireless device which is different from the second wireless device, said method comprising the steps of:

creating a first group information that identifies said first wireless device in the first wireless device and setting the first group information for said first wireless device;

creating a second group information that identifies said third wireless device in the third wireless device and is different from the first group information and setting the second group information for said third wireless device;

transmitting the first group information from said first wireless device to said second wireless device;

transmitting the second group information from said third wireless device to said fourth wireless device;

setting the first group information for said second wireless device;

setting the second group information for said fourth wireless device;

creating identification information that identifies said second and fourth wireless devices with the first and second group information set in the first and third wireless devices, respectively, the identification information is identical in said second and fourth wireless devices;

transmitting the identification information from said first wireless device to said second wireless device;

transmitting the identification information from said third wireless device to said fourth wireless device;

setting the identification information for said second wireless device;

setting the identification information for said fourth wireless device;

using the first group information and the identification information to specify said second wireless device to establish the wireless connection between said first and second wireless devices; and using the second group information and the identification information to specify said fourth wireless device to establish the wireless connection between said third and fourth wireless devices.

2. The method in accordance with claim 1, wherein the first and second group information is set at a startup of said first and second wireless device, respectively.

3. The method in accordance with claim 1, wherein said first and third wireless devices transmit the first and second group information to said second and fourth wireless devices during idle time, respectively.

4. The method in accordance with claim 1, wherein, said first and third wireless devices transmit information to be hidden as well as the first and second group information, respectively.

5. The method in accordance with claim 1, wherein said first and third wireless devices transmit the identification information to said second and fourth wireless devices during idle time.

6. The method in accordance with claim 1, wherein the identification information is a USB address.

7. The method in accordance with claim 1, further comprising the step of creating a random number for identifying said second wireless device temporally in the second wireless device; and creating a random number for identifying said fourth wireless device temporally in the fourth wireless device.

8. The method in accordance with claim 7, further comprising the step of transmitting the first group information and the random number from the second wireless device to the first wireless device; and transmitting the second group information and the random number from the fourth wireless device to the third wireless device.

9. The method in accordance with claim 8, wherein said first and third wireless devices transmit the random number to said second and fourth wireless device, respectively, as well as the identification information.

10. A method for establishing a wireless connection between a first wireless device provided in a first computer and a second wireless device, and between a third wireless device provided in a second computer which is different from the first computer and a fourth wireless device which is different from the second wireless device, said method comprising the steps of:

receiving a first group information that identifies said first wireless device in the first wireless device and setting the first group information for said first wireless device;

receiving a second group information that identifies said third wireless device in the third wireless device and is different from the first group information and setting the second group information for said third wireless device;

setting the first group information for said second wireless device;

setting the second group information for said fourth wireless device;

receiving identification information that identifies said second and fourth wireless devices with the first and second group information set in the first and third wireless devices, respectively, the identification information is identical in said second and fourth wireless devices;

setting the identification information for said second wireless device;

setting the identification information for said fourth wireless device using the first group information and the identification information to specify said second wireless device to establish the wireless connection between said first and second wireless devices; and using the second group information and the identification information to specify said fourth wireless device to establish the wireless connection between said third and fourth wireless devices.

11. A system for establishing a wireless connection between a first wireless device provided in a first computer and a second wireless device and between a third wireless device provided in a second computer which is different from the first computer and a fourth wireless device which is different from the second wireless device, said system comprising:

a first group information creating circuit for creating a first group information that identifies said first wireless device;

a second group information creating circuit for creating a second group information that identifies said third wireless device and is different from the first group information;

first and second storages for storing the first and second group information, respectively;

identification information creating circuits for creating identification information that identifies said second and fourth wireless devices, the identification information is identical in said second and fourth wireless devices;

third storage for storing the first group information and identification information; and a fourth storage for storing the second group information and identification information, the first group information and the identification information being used to specify said second wireless device to be wirelessly connected to said first wireless device to establish the wireless connection between said first and second devices, and the second group information and the identification information being used to specify said fourth wireless device to be wirelessly connected to said third wireless device to establish the wireless connection between said third and fourth devices.

12. The system in accordance with claim 11, wherein the first and second group information is set at a startup of said first and third wireless devices, respectively.

13. The system in accordance with claim 11, further comprising a first transmitter for transmitting the first group information and the identification information to said second wireless device to have said second wireless device set the first group information; and a second transmitter for transmitting the second group information and the identification information to said fourth wireless device to have said fourth wireless device set the second group information.

14. The system in accordance with claim 13, wherein said transmitters transmit the group information and the identification information during idle time.

15. The system in accordance with claim 13, wherein said transmitters transmit information to be hidden as well as the group information.

16. A method for establishing a wireless connection between a first wireless device and a first computer comprising a first USB hub, and between a second wireless device and a second computer comprising a second USB hub, said second wireless device and second computer being different from the first wireless device and first computer, respectively, said method comprising the steps of:

setting a first group information that identifies said first wireless device for said first wireless device;

setting a second group information that identifies said second wireless device and is different from the first group information for said first wireless device;

setting identification information that identifies said first and second wireless devices, the identification information is identical in said first and second wireless devices;

using the first group information and the identification information to specify said first wireless device; and using the second group information and the identification information to specify said second wireless device.

17. The method in accordance with claim 16, wherein the first and second group information is set at a startup of the first and second USB hubs in said first and second computers, respectively.

* * * * *